(12) United States Patent
Mazzocchi et al.

(10) Patent No.: US 10,254,935 B2
(45) Date of Patent: Apr. 9, 2019

(54) SYSTEMS AND METHODS OF PROVIDING CONTENT SELECTION

(71) Applicant: Google Inc., Mountain View, CA (US)

(72) Inventors: Stefano Mazzocchi, Los Angeles, CA (US); Kaikai Wang, Bellevue, WA (US); John Thomas DiMartile, III, Seattle, WA (US); Tim Wantland, Bellevue, WA (US)

(73) Assignee: Google LLC, Mountain View, CA (US)

( * ) Notice: Subject to any disclaimer, the term of this patent is extended or adjusted under 35 U.S.C. 154(b) by 210 days.

(21) Appl. No.: 15/196,168

(22) Filed: Jun. 29, 2016

(65) Prior Publication Data

US 2018/0004397 A1    Jan. 4, 2018

(51) Int. Cl.
| | |
|---|---|
| *G06F 3/048* | (2013.01) |
| *G06F 3/0484* | (2013.01) |
| *G06F 17/30* | (2006.01) |
| *G06F 3/0486* | (2013.01) |
| *G06F 3/0488* | (2013.01) |
| *G06K 9/18* | (2006.01) |
| *G06K 9/62* | (2006.01) |

(52) U.S. Cl.
CPC ........ *G06F 3/04842* (2013.01); *G06F 3/0486* (2013.01); *G06F 3/0488* (2013.01); *G06F 17/30253* (2013.01); *G06F 17/30867* (2013.01); *G06K 9/18* (2013.01); *G06K 9/6256* (2013.01)

(58) Field of Classification Search
None
See application file for complete search history.

(56) References Cited

U.S. PATENT DOCUMENTS

| | | |
|---|---|---|
| 2006/0156209 A1 | 7/2006 | Matsuura et al. |
| 2011/0074685 A1 | 3/2011 | Causey et al. |
| 2012/0042036 A1 | 2/2012 | Lau et al. |
| 2012/0131520 A1 | 5/2012 | Tang et al. |
| 2014/0035846 A1 | 2/2014 | Lee et al. |
| 2014/0189538 A1 | 7/2014 | Martens et al. |

(Continued)

FOREIGN PATENT DOCUMENTS

| | | |
|---|---|---|
| EP | 2 523 436 | 11/2012 |
| EP | 2703980 | 3/2014 |

OTHER PUBLICATIONS

Chen et al. "Bezel Copy: An Efficient Cross-Application Copy-Paste Technique for Toachscreen Smarlphones.", Advanced Visual Interfaces, ACM, New York, New York, May 27, 2014, pp. 185-192.

(Continued)

*Primary Examiner* — William C Trapanese
(74) *Attorney, Agent, or Firm* — Dority & Manning, P.A.

(57) ABSTRACT

Systems and methods of providing content selection are provided. For instance, one or more signals indicative of a user selection of an object displayed within a user interface can be received. Responsive to receiving the one or more signals, a content attribute associated with one or more objects displayed within the user interface can be identified. A content entity can be determined based at least in part on the content attribute and the user selection. One or more relevant actions can then be determined based at least in part on the determined content entity. Data indicative of the relevant actions can then be provided for display.

20 Claims, 8 Drawing Sheets

(56) References Cited

U.S. PATENT DOCUMENTS

2014/0201675 A1  7/2014  Joo et al.
2014/0372349 A1* 12/2014  Driscoll ............ G06F 17/30864
                                                 706/12
2015/0095855 A1*  4/2015  Bai ........................ G06F 3/017
                                                 715/863

OTHER PUBLICATIONS

International Search Report PCT/US2016/065703, dated Feb. 27, 2017, 13 pages.
The International Preliminary Report on Patentability for Application No. PCT/US2016/065703 dated Jan. 10, 2019, 10 pages.

* cited by examiner

SYSTEMS AND METHODS OF PROVIDING CONTENT SELECTION

FIELD

The present disclosure relates generally to user interfaces selecting content displayed within a user interface.

BACKGROUND

Modern user computing devices generally include one or more input devices that allow users to interact with a user interface displayed by the user computing devices. For instance, many user computing devices include a touch screen display device able to detect the presence and location of a touch on the surface of the screen. In this manner, a user can manipulate or control a user interface displayed by the touch screen device through initiating contact with the device.

Some user interface actions can be difficult to implement using a touch screen. For instance, it can be difficult to perform a copy and/or paste function using a touch screen device. Conventional touch screen devices can include various techniques for a user to select text to be copied and for the copied text to eventually be pasted in a desired destination. However, such conventional techniques can be unintuitive, inefficient, and/or slow. In addition, such techniques may not be universal across the various applications installed on the user device requiring the user to learn a number of different techniques for different contexts.

One example text selection technique allows a user to perform a "long press" gesture on desired text displayed within a user interface to facilitate a selection of the text by the user device. Such long press technique may include a default selection of one or more characters or words proximate the long press location within the user interface. However, such default location may be inaccurate and may not fully capture all of the text that the user wishes to select. In addition, once the text is copied, it may not be clear how to access the copied text and/or to paste the copied text in the desired destination.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of providing content selection. The method includes receiving, by one or more computing devices, one or more signals indicative of a user selection of an object displayed within a user interface. The method further includes, responsive to receiving the one or more signals indicative of the user selection, identifying, by the one or more computing devices, a content attribute associated with one or more objects displayed within the user interface. The method further includes determining, by the one or more computing devices, a content entity based at least in part on the content attribute associated with the one or more objects and the user selection. The method further includes determining, by the one or more computing devices, one or more relevant actions to be performed based at least in part on the determined content entity. The method further includes providing for display, by the one or more computing devices, data indicative of the one or more relevant actions.

Other example aspects of the present disclosure are directed to systems, apparatus, tangible, non-transitory computer-readable media, user interfaces, memory devices, and electronic devices for providing content selection techniques.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
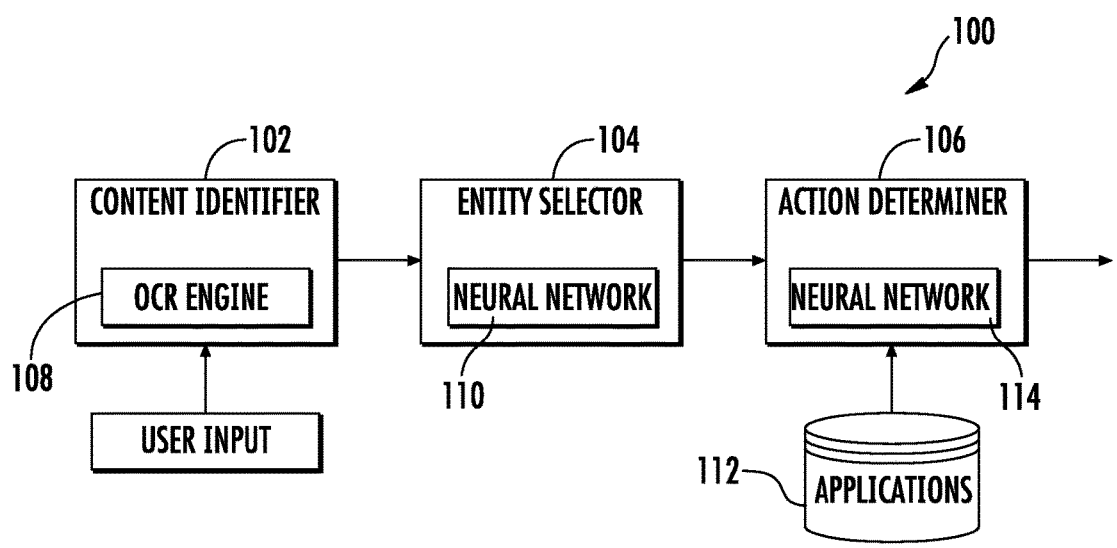
FIG. 1 depicts an example system for providing content selection according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing content selection techniques within a user interface associated with a user device. For instance, one or more signals indicative of a selected interface object displayed within a user interface can be received. The user interface can include a plurality of objects, such as images, text (e.g. characters and/or words), icons, graphics, etc. The one or more signals indicative of the selected object can be associated with an input by a user indicative of a selection of an object. The user device can then determine a content attribute associated with the selected object. The content attribute can include an identifying feature of the selected object. For instance, the content attribute can identify one or more characters or word represented by the selected object. The user device can then determine a content entity based at least in part on the determined content attribute. The user device can then determine one or more relevant actions based at least in part on the content entity. The relevant actions can include one or more actions to be performed by the user device that are estimated to be related to the content entity. The relevant actions can be provided for display within the user interface.

In some implementations, the user can select an object by interacting with a content selection element associated with the user interface. For instance, the user device can include a touch screen device capable of receiving touch inputs from a control article (e.g. finger of a user, stylus, etc.). In such implementations, the content selection element can be a draggable user interface element, such that the user can "drag" the content selection element to a desired object displayed within the user interface and "drop" the content selection element on or near the object to facilitate a selection of the object by the user device. For instance, in some implementations, the user can "grab" the content selection element by performing a "long press" with an input article on a location of a touch screen of the user device corresponding to the location of the content selection element. The user can then move the input article across the touch screen to a desired drop point on or near a desired object, and can remove the input article from the touch screen at the drop point. The content selection element can be moved across the user interface to track the finger of the user from the grab point wherein the long press was initiated to the drop point as the user moves the control article across the touch screen. In some implementations, the content selection element can be rendered as a visible dot or other suitable indicator displayed within the user interface.

In response to receiving the one or more signals indicative of the selected object, the user device can identify a content attribute associated with the selected object. The content attribute can include an identifying feature of the selected object. For instance, the content attribute can include one or more text characters or words represented by the selected object. As another example, when the selected object is an image displayed within the user interface, the content attribute can include a category, classification, and/or other identifying feature of one or more items (e.g. non-text objects) depicted in the image. In some implementations, determining a content attribute of the selected object can include obtaining an image of the user interface in which the selected object is displayed. For instance, the image can be obtained by capturing a screenshot of the data displayed by a display device of the user device. The obtained image can depict a plurality of objects displayed in association with a user interface of the user device. As indicated, the plurality of objects can include text, images, user interface elements, and/or various other suitable objects. For instance, the text can be machine-editable text and/or text depicted within an image displayed within the user interface. The obtained image can be provided as input to an optical character recognition (OCR) engine. In some implementations, the OCR engine can be stored or otherwise located locally in the user device. The OCR engine can be implemented using one or more machine learning techniques, such as using a neural network, k-nearest neighbor, support vector machine, logistic regression, and/or any other suitable machine learning technique. The OCR engine can identify text depicted in the obtained image of the user interface. For instance, the OCR engine can identify a plurality of characters and/or words displayed within the user interface, as depicted in the obtained image. In some implementations, the OCR engine can further determine a location of the identified characters and/or words within the obtained image and/or the user interface.

The selected object can be determined by comparing a location of the drop point of the content selection element to the locations of the various objects within the user interface. For instance, the selected object can be determined to be the closest object within the user interface to the drop point of the content selection element. As another example, the selected object can be determined to be an object within the user interface located within a threshold distance of the drop point of the content selection element. As indicated, in some implementations, the locations of the objects within the user interface can be determined using the OCR engine. For instance, the OCR engine can receive the obtained image of the user interface as input and can provide as output the identified content attributes (e.g. recognized text, image classifications, etc.) of the objects depicted in the image and a location of such object depicted in the image.

The content entity can represent an estimation of one or more objects that the user intended to select by dropping the content selection element at the drop point. In some implementations, the content entity can include the selected object and one or more additional objects displayed within the user interface. For instance, when the selected object is a single word of text, the content entity can include one or more additional words of text. In such implementations, the content entity can be a text entity, such as a phrase, sentence, address, line of text, movie title, food item, point of interest, name, etc. associated with the selected object. In implementations wherein the selected object is an image displayed within the user interface, the content entity can be the entire image, or one or more portions of the image, such as one or more (non-text) items depicted within the image. In some implementations, the content entity can be determined by analyzing one or more objects proximate the selected object. For instance, if the object is a word located in a string of text, one or more additional words proximate the selected word in the string of text can be analyzed in view of the selected word to determine a relationship between the words. In some implementations, the content entity can be determined using one or more machine learning techniques. For instance, the content entity can be determined using a neural network or other suitable machine learning network stored in or otherwise associated with the user device. In this manner, one or more categories of the content entity can be determined. For instance, the content entity can be categorized as a phrase, address, city, restaurant, movie title, book title, song title, sentence, idiom, name, and/or other suitable category.

Once the content entity has been determined, one or more relevant actions associated with the content entity can be determined. For instance, the one or more relevant actions can be associated with one or more applications installed on the user device. The relevant actions can be determined based at least in part on a determined category of the content entity. For instance, if the content entity is an address of a restaurant, the relevant actions can include causing a mapping application installed on the user device to display a map of a geographic area proximate the restaurant and/or navigational instructions to the restaurant. As another example, if the content entity is the title of a movie, the relevant actions can include searching for viewing times of the movie at local theaters using a web browser or movie application installed on the user device. In some implementations, the relevant actions can be determined based at least in part on a determined context associated with the user interface, selected object, and/or the content entity. For instance, if the content entity is located within a web browser, the relevant actions can include a web search of the content entity using a suitable search engine. As another example, if the content entity is an image, the relevant actions can include an image search for images similar to the content entity.

In some implementations, at least one relevant action can be determined using one or more machine learning techniques. For instance, the relevant applications can be determined using a neural network or other machine learning network stored on or otherwise associated with the user device. In this manner, data associated with the content entity and/or the user interface can be provided to the neural network as input, and the neural network can determine one or more suitable actions associated with the content entity and/or user interface. In some implementations, at least one relevant action can be a default action. A default action can be a relevant action not determined based on the content entity. For instance, the default actions can include a "copy" action, a web search action, and/or other default or generic actions to be performed by the user device.

The relevant actions can be provided for display, for instance, in a menu associated with the user interface. In this manner, in response to a selection of an object by the user using the content selection element, the user device can display one or more relevant actions to be performed by the user device.

With reference now to the figures, example aspects of the present disclosure will be discussed in greater detail. For instance, FIG. 1 depicts an example system for providing content selections according to example embodiments of the present disclosure. System 100 can be implemented within a user computing device, such as a smartphone, tablet, wearable computing device, laptop, desktop, and/or other suitable user device. In some implementations, the user computing device can correspond to user device 610 of FIG. 8, or other suitable user computing device. System 100 includes a content identifier 102, an entity selector 104, and an action determiner 106.

Content identifier 102 can be configured to receive an input from a user indicative of a request from the user to select content displayed within a user interface associated with system 100. For instance, the user interface can be displayed by a display device associated with system 100. In some implementations, the display device can include a touch screen capable of receiving touch inputs from an input article (e.g. finger, stylus, etc.) associated with a user. As will be discussed in greater detail below, the user input can be associated with a content selection user interface element displayed within the user interface. For instance, in some implementations, the user can "grab" the content selection element by performing a long press action (e.g. using an input article) at a location on the display device corresponding to the location of the content selection element within the user interface. The user can then "drag" the content selection element to a desired drop location proximate one or more objects depicted within the user interface by moving the input article across the screen of the display device to the drop location. The user can then "drop" the content selection element at the drop location by removing the input article from the display device to facilitate a selection by system 100 of the one or more objects displayed within the user interface.

In response to receiving the user input, content identifier 102 can determine a content attribute of one or more objects displayed within the user interface. For instance, content identifier 102 can identify or recognize one or more object depicted within the user interface. Content identifier 102 can identify or recognize text, images, and/or other objects depicted in at least a portion of the user interface. In some implementations, content identifier 102 can distinguish between text and images depicted within the user interface. In some implementations, content identifier can distinguish between editable text depicted within the user interface and non-editable text depicted within an image displayed within the user interface. In various implementations, content identifier 102 can identify each object currently displayed within the user interface or a subset of objects. For instance, content identifier 102 may identify objects displayed in a portion of the user interface proximate the drop location of the content selection element, or content identifier 102 may identify each object displayed within the user interface at the time that the user input was received.

In some implementations, identifying or recognizing objects displayed within the user interface can include obtaining an image (e.g. an electronic image) of the user interface. For instance, in response to receiving the user input, content identifier 102 can "capture" a screenshot of the user interface as displayed by the display device. One or more OCR techniques can then be performed on the obtained image. In such implementations, content identifier 102 can include an OCR engine 108. In this manner, at least a portion of the obtained image (e.g. screenshot) can be provided as input to OCR engine 108. OCR engine 108 can be configured to identify or recognize text depicted in the obtained image using one or more OCR techniques. For instance, OCR engine 108 can convert the obtained image to machine-encoded text. In some implementations, OCR engine 108 can be implemented using an artificial neural network having a plurality of interconnected operators or nodes arranged in a plurality of layers. It will be appreciated that various other suitable OCR engines can be used without deviating from the scope of the present disclosure.

As indicated, in some implementations, content identifier 102 can distinguish between text objects and image objects depicted within the user interface. For instance, content identifier 102 can make an initial determination of one or more categories or identifying features of the objects depicted in the user interface. Content identifier 102 can further distinguish between machine-encoded text within the user interface and unrecognizable text (e.g. text depicted in images displayed in the user interface). In this manner, content identifier 102 can determine if an OCR process is necessary to determine the contents of the text. For instance, if content identifier 102 can initially read or recognize the text objects depicted in the at least a portion of the user interface, the OCR process may not be necessary. If content identifier 102 is unable to initially read or recognize the text object in the at least a portion of the user interface, content identifier 102 may obtain an image of the at least a portion of the user interface and provide the obtained image to OCR engine 108 for conversion of the image to machine-encoded text.

Content identifier 102 can further determine a location of the one or more objects displayed within the user interface. For instance, content identifier 102 can determine coordinates (e.g. x, y coordinates) of the one or more objects (characters, words, images, etc.) with respect to the user interface. In some implementations, the locations of the objects can be determined by OCR engine 108.

In implementations wherein the one or more identified objects include an image displayed within the user interface, content identifier 102 may determine a classification and/or category associated with the image. For instance, content identifier 102 can determine that an image depicts a particular item (e.g. dog, tree, purse, building, etc.). In this manner, content identifier 102 can recognize one or more items depicted in an image displayed within the user interface, and can classify or categorize the one or more items.

Content identifier 102 can provide data indicative of the identified objects to entity selector 104. Entity selector 104 can determine a content entity associated with the one or more objects selected by the user. In particular, entity selector 104 can identify an object selected by the user by comparing a location of the user input (e.g. relative to the user interface) with the locations of the objects displayed within the user interface. For instance, in implementations wherein the user input is provided through user interaction with the content selection element, the location of the drop point of the content selection element by the user can be analyzed to determine a corresponding object. The corresponding object can represent an object that the user intended to select. For instance, the object having the most proximate location within the user interface to the drop point can be determined to be the selected object. As another example, one or more objects within a threshold radius of the drop point can be determined to be the selected object(s). As yet another example, the selected object can be the most proximate object to the drop point of one or more candidate objects that are within the threshold radius of the drop point. The selected object can be a word object, a character object, an image object, etc.

Entity selector 104 can analyze the content attribute of the selected object to determine a content entity associated with the user input. For instance, the content entity can be an estimation of one or more objects that the user intended to select via the user input. For instance, the content entity may include only the selected object, or the content entity may include one or more additional objects that can be combined with the selected object to form the content entity. For instance, the selected object may be a single word in a phrase, address, name, or other textual entity. The content entity can be determined to be the entire phrase, address, name, or other textual entity. In this manner, one or more additional objects (e.g. the content attributes of the one or more additional objects) proximate the selected object can be analyzed in view of the selected object to determine if the one or more additional objects, together with the selected object, form a cohesive entity.

In some implementations, entity selector 104 can analyze the location and/or size of the one or more additional objects to determine a content entity. For instance, objects in a line or other proximate position relative to the selected object can be given more weight in the determination of the content entity. In addition, objects having similar size to the selected object may also be given more weight. In this manner, the layout and configuration of the objects within the user interface may be analyzed to determine the content entity.

Entity selector 104 can include a neural network 110. In some implementations, entity selector 104 can provide data indicative of one or more objects (e.g. the selected object and one or more additional objects) as input to neural network 110. Neural network 110 can be configured to provide as output a determination of whether the one or more objects form a content entity. In some implementations, neural network 110 can further be configured to determine a category or classification associated with the content entity. For instance, neural network 110 can determine that the content entity is an address, a movie, a restaurant, business, a point of interest, a name, etc.

In implementations wherein the selected object is an image displayed within the user interface, the content entity may be determined to be the entire image or one or more items depicted within the image. For instance, the content entity can be determined by comparing a location associated with the user input (e.g. the drop point) to the location of a plurality of items depicted in the image. In this manner, if the location of an item depicted in the image corresponds to the location of the user input, the item can be determined to be the content entity.

In some implementations, the initial content entity as determined by entity selector 104 can be modified by the user. In this manner, if the content entity does not accurately represent the intended selection by the user, the selected entity can be modified by the user to accurately represent the intended selection. For instance, the selected content entity can be adjusted by the user to include more or less objects. In implementations wherein the selected content entity is an image, the entity may be adjusted by the user to be limited to one or more items depicted in the image.

Action determiner 106 can determine one or more relevant actions to be performed by the user device based at least in part on the content entity. The relevant actions can include actions associated with the content entity that may be helpful or useful to the user. In this manner, the relevant actions can predict an action that the user may desire to perform on the user device using the content entity. As indicated, the relevant actions can be associated with one or more applications 112 installed on or otherwise associated with the user device. For instance, the one or more relevant actions can be actions associated with the content entity to be performed using one or more applications 112. The actions can be determined based at least in part on the category or classification of the content entity. As an example, if the content entity is an address, a relevant action can be an action of providing for display directions to the address using a mapping application installed on the user device. As another example, if the content entity is a restaurant, a relevant action can be an action of providing for display information associated with the restaurant (e.g. menu, reviews, operating hours, etc.) using a suitable application installed on the user device. As yet another example, if the content entity is an image depicting an article of clothing, a relevant action can be performing an online image search for similar images, or performing a search for similar articles of clothing for sale.

In some implementations, the relevant actions can further be determined based at least in part on a context of the user interface. The context can be associated with one or more applications currently running on the user device. For instance, if the selected object is an object associated with a messaging application, a relevant action can be to send a message that includes the content entity using the messaging application.

In some implementations, the relevant actions can include one or more generic actions not determined based on the content entity. The generic actions can be actions that are not determined "intelligently" by analyzing the content entity. In this manner, a generic action can be an action that may be relevant to any selection of content by the user, regardless of the content. As an example, the generic actions can include web search actions, copy/paste actions, or other suitable actions determined without regard for the content entity.

Action determiner 106 can include a neural network 114. In some implementations, neural network 114 can be used to determine the one or more relevant actions. For instance, data indicative of the content entity and/or a context associated with the user interface or user device can be provided to neural network 114 as input, and neural network 114 can provide one or more relevant actions as output. In this manner, the outputted actions can be determined "intelligently" based at least in part on the content entity and/or context associated with the user device or user interface.

Data indicative of at least one of the relevant actions can be provided for display within the user interface. For instance, icons representing the at least one action can be provided for display in a menu associated with the user interface. Selection of an icon by the user can prompt the user device to perform the action associated with the icon. For instance, selection of an icon can prompt the user device to open the appropriate application and to perform the action within the application.

As indicated, content identifier 102, entity selector 104, and/or action determiner 106 can all be implemented within a single user computing device. In this manner, example aspects of the present disclosure can be performed by the user computing device without communication with a remote computing device (e.g. server). Such single device implementation can provide for privacy protection of the user of the user computing device be eliminating the need for communication between the device and a server. In addition, such single device implementation can provide for increased speed and efficiency in implementing aspects of the present disclosure.

In such single device implementations, the neural networks associated with system 100 (e.g. neural network 110, neural network 114, and/or other neural network) may be trained at one or more servers, and the trained networks can be provided to the user computing device. In some implementations, one or more updates to the neural networks may be periodically provided to the user computing device from the one or more servers.

Figure 2:
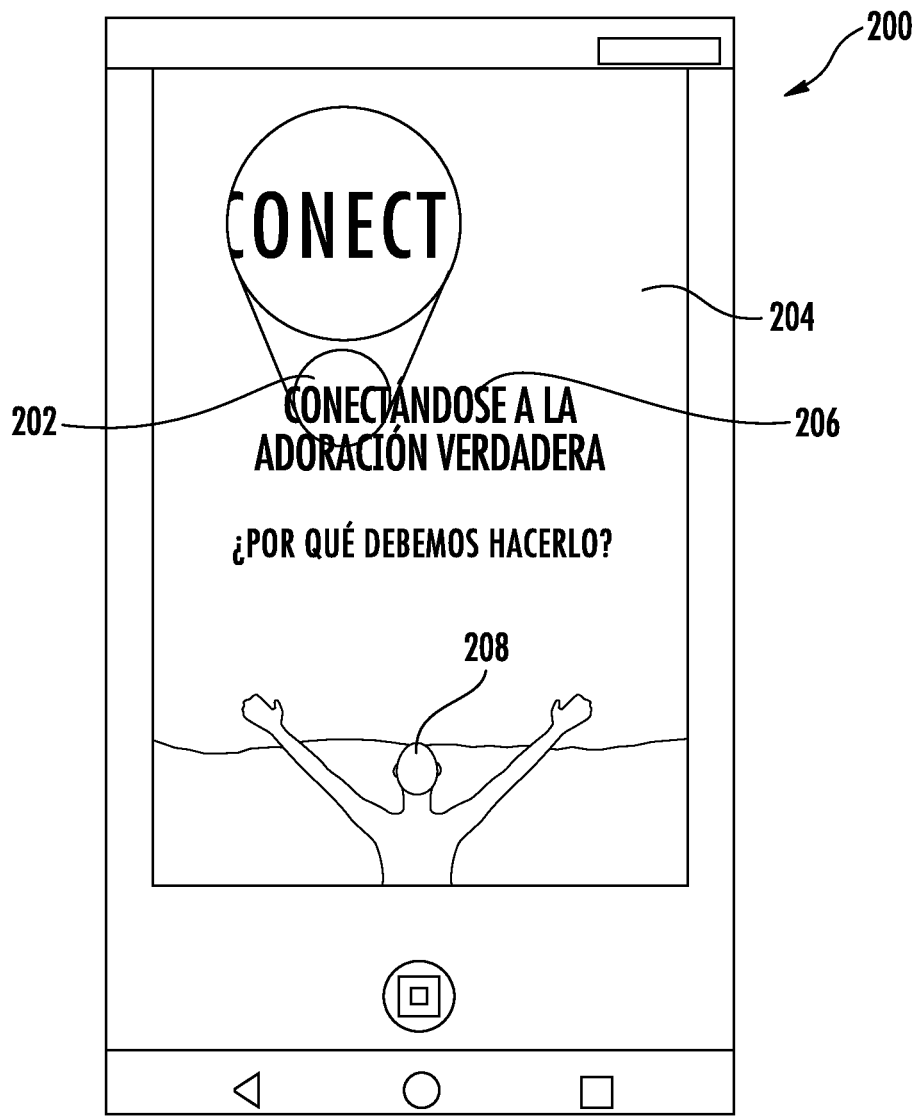
FIGS. 2-4 depict example user interfaces according to example embodiments of the present disclosure.

FIG. 2 depicts an example user interface 200 according to example embodiments of the present disclosure. User interface 200 can be provided for display, for instance, by user device 610 of FIG. 8, or other user computing device. User interface 200 includes a content selection element 202 and an image 204. As shown, content selection element 202 is represented as a visible user interface element. Although content selection element 202 is provided as a circular "dot," element, it will be understood that various other suitable representations can be used. Content selection element 202 can be a draggable interface element capable of being "grabbed" by a user, "dragged" to and "dropped" at a desired location. In various implementations, content selection element can receive control inputs using various suitable interface techniques, such as for instance, touch-based inputs, mouse inputs, keyboard inputs, touchpad inputs, voice or audio inputs, etc.

As shown in FIG. 2, content selection element 202 is located above a text object 206 that represents the Spanish word "Conectándose," as depicted in image 204. When content selection element 202 is dropped over text object 206 (e.g. when the user removes the input article from a touch screen displaying user interface 200), content attributes of one or more objects displayed within user interface 200 can be determined. For instance, as indicated above, an electronic image of user interface 200 can be obtained and one or more OCR techniques can be performed on the obtained image to identify or recognize text depicted within user interface 200. In this manner, it can be determined that the user has selected text object 206, and it can be determined that text object 206 represents the word "Conectandose."

Figure 3:
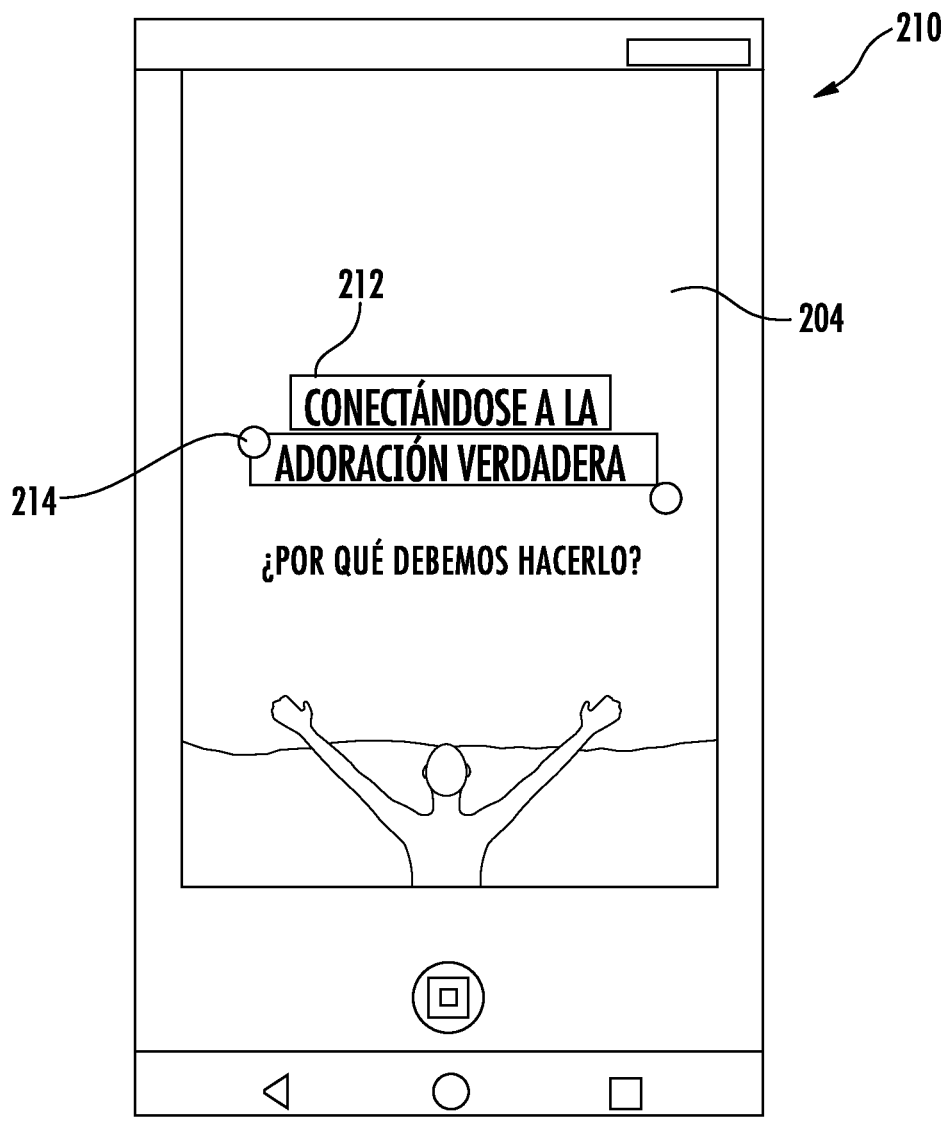

FIG. 3 depicts an example user interface 210 according to example embodiments of the present disclosure. User interface 210 corresponds to user interface 200 subsequent to a selection of a content entity. User interface 210 includes image 204 and content entity 212. Content entity 212 includes text object 206 and additional text objects depicted within image 204 that represent the entire Spanish phrase "Conectandose a la adoracion verdadera." As shown, content entity 212 is highlighted within user interface 210 to indicate the selection of content entity 212. The highlighted entity can be adjusted using entity adjusters 214. Entity adjusters 214 can be controlled by the user to adjust the highlighted portion of user interface 210, and thereby to adjust the content entity. For instance, the user can grab and drag adjusters 214 to a desired location within user interface 210 to facilitate selection of a desired content entity after the initial selection of a content entity by the user device.

As indicated above, content entity 212 can be determined based at least in part on the content attribute (e.g. "Conectandose") of text object 206. In particular, content entity 212 can be determined to complete the entire phrase "Conectandose a la adoracion verdadera," of which text object 206 is a part. In this manner, the additional text words depicted in user interface 210 can be analyzed in view of text object 206 to determine if the additional words contribute to a common phrase or other entity of which text object 206 is a part. As indicated, content entity 212 can be determined based at least in part on the layout and/or configuration of the objects depicted in user interface 200 and/or 210. For instance, the words "a la adoracion verdadera," are grouped proximate text object 206. In this manner, the grouping of words may be given more weight in the determination of content entity 212. In some implementations, content entity 210 can be determined based at least in part on the layout/configuration of the objects and the content attributes associated with the objects. For instance, the content attributes of similarly sized objects located proximate (e.g. in a grouping with) text object 206 can be analyzed to determine if the objects form an entity.

Figure 4:

FIG. 4 depicts an example user interface 220 according to example embodiments of the present disclosure. User interface 220 can correspond to user interface 210 subsequent to a determination of one or more relevant actions based at least in part on content entity 212. In this manner, user interface 220 can include relevant actions 222. As shown, relevant actions 222 include a translate action, a web search action, a dictionary action, and a copy action. It will be appreciated that various other suitable relevant actions can be included in user interface 220.

As indicated, upon selection of a relevant action 222 by the user, the user computing device can perform the selected action. For instance, if the user selects the translate action, the user computing device can perform a translation of content entity 212 to another language. In this manner, the user computing device can determine that content entity 212 is a Spanish phrase, and can translate the phrase to a desired language. For instance, the user computing device can open a translation application installed on the user computing device, and can perform the translation using the translation application.

It will be appreciated that various other suitable content entities can be determined within user interfaces 200-220 based at least in part on various other suitable user inputs. For instance, a user selection of text object 208 in user interface 200 could cause a determination of text object 208 as the content entity. In this manner, the relevant actions could include an image search for images similar to text object 208 and/or image 204. It will be further appreciated that the user interfaces 200-220 depicted in FIGS. 2-4 are intended for illustrative purposes only. In particular, it will be appreciated that various other suitable user interfaces can be used without deviating from the scope of the present disclosure.

Figure 5:
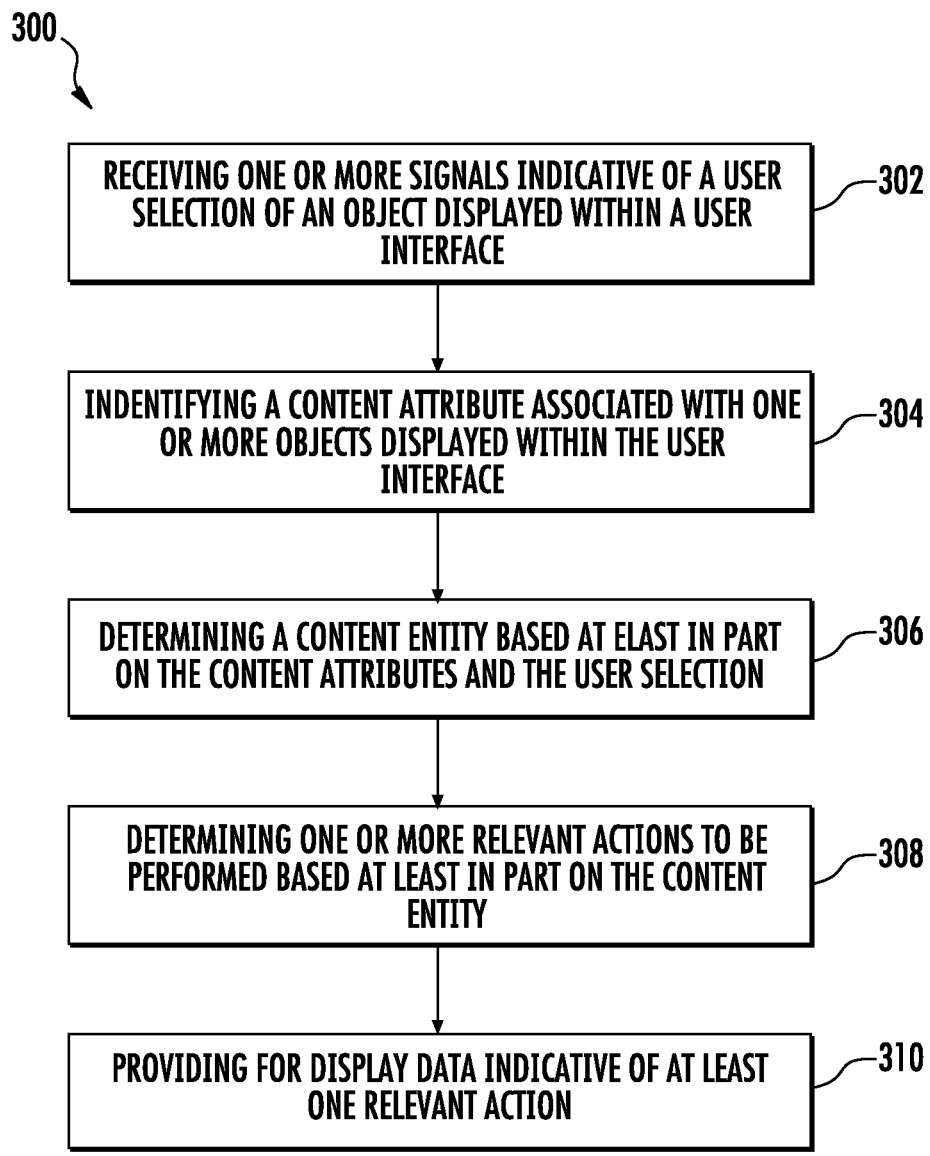
FIG. 5 depicts a flow diagram of an example method of providing content selection according to example embodiments of the present disclosure.

FIG. 5 depicts a flow diagram of an example method (300) of providing content selections according to example embodiments of the present disclosure. Method (300) can be implemented by one or more computing devices, such as one or more of the computing devices depicted in FIG. 8. In particular implementations, method (300) can be implemented by content identifier 102, entity selector 104 and/or action determiner 106 depicted in FIG. 1. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include receiving one or more signals indicative of a user selection of an object displayed within a user interface. The user interface can include a plurality of objects, such as text objects, image objects, user interface element objects, etc. In some implementations, one or more text objects may be depicted in an image object. The one or more signals can be associated with a user input indicative of a request by the user to select or highlight the object. The user input can be any suitable input, such as a touch input, a mouse input, keyboard input, etc. In some implementations, the user input can be performed through interaction with a content selection element displayed within the user interface. For instance, the user can drag the content selection element to a desired drop point or location within the user interface to facilitate a selection by the user device of an object proximate the drop point within the user interface.

At (304), method (300) can include identifying a content attribute associated with one or more objects displayed within the user interface. For instance, the content attribute can be identified in response to receiving the user input. The content attribute can include one or more identifying features of the one or more objects. For instance, the content attribute can specify an object type (e.g. text object, image object, etc.). The content attributes for text objects can further include machine-readable and/or machine-encoded text associated with the text object. The content attributes for image objects may include a classification or category associated with one or more non-text items depicted in the image. In some implementations, the content attributes can further include or otherwise be associated with a location of the objects within the user interface.

As indicated above, at least one content attribute can be determined by obtaining an electronic image of the user interface (e.g. a screenshot), and performing one or more OCR techniques on the obtained image. In some implementations, the obtained image can be an image of the entire user interface, or of a subset of the user interface (e.g. a region surrounding the drop point). The obtained image may be provided as input to one or more OCR engines associated with the user device. The one or more OCR engines can extract text from the obtained image and can convert the image to machine-encoded text. The OCR engine may further determine a location of the text within the image and/or the user interface. In some implementations, the OCR engine may be implemented using one or more neural networks.

The locations of the objects within the user interface and/or the content attributes of the objects can be used to determine a selected object. The location of the drop point can be compared to the locations of the objects within the user interface to determine the selected object. For instance, the selected object may be determined to be the object closest to the drop point and/or an object within a threshold distance from the drop point.

At (306), method (300) can include determining a content entity based at least in part on the content attributes and the user selection. The content entity can be an estimation of one or more objects that the user desires to select. As indicated, the content entity can include the selected object. In some implementations, the content entity can include one or more objects in addition to the selected object that can be combined with the selected object to form an entity. For instance, such content entity can be an address, point of interest, name, phrase, sentence, paragraph, etc. In an instance wherein the selected object is an image, the content entity can include the entire image and/or one or more items depicted within the image.

The content entity can be intelligently determined based at least in part on the content attribute of the selected object. For instance, the content attribute of the selected object can be analyzed in view of the content attributes of one or more additional objects to determine if the selected object and the one or more additional objects are part of the same entity. In some implementations, content entity can be determined based at least in part on the configuration and/or layout of the objects within the user interface. For instance, objects physically grouped together with the selected object within the user interface may be given more weight in determining whether the objects are part of the same entity. As another example, objects having the same size and/or font as the selected object may be given more weight in determining whether the objects are part of the same entity.

In some implementations, a category or classification of the content entity may be determined. For instance, it may be determined that the content entity is an address, movie, song title, etc. In some implementations, the language of the content entity may be determined. In some implementations, the content entity and/or the classification of the content entity may be determined using a neural network, or other suitable machine learning technique.

At (308), method (300) can include determining one or more relevant actions to be performed based at least in part on the content entity. For instance, the relevant actions can be actions estimated by the user device to be relevant to the content entity and/or the category of the content entity. In this manner, the relevant actions may be determined to be helpful or useful to the user in response to the selection of the content entity. In this manner, the relevant actions can be determined based at least in part on the content entity and/or the category or classification of the content entity. In some implementations, the relevant actions can be determined based at least in part on a current status or context associated with the user device. As indicated, the relevant actions can be associated with one or more applications installed on the user device. In this manner, the relevant actions can be determined based at least in part on the available applications installed on the user device.

At (310), method (300) can include providing for display data indicative of at least one relevant action. For instance, the data indicative of the at least one relevant action can include an icon that, when selected by the user, prompts the user device to perform the selected action.

Figure 6:
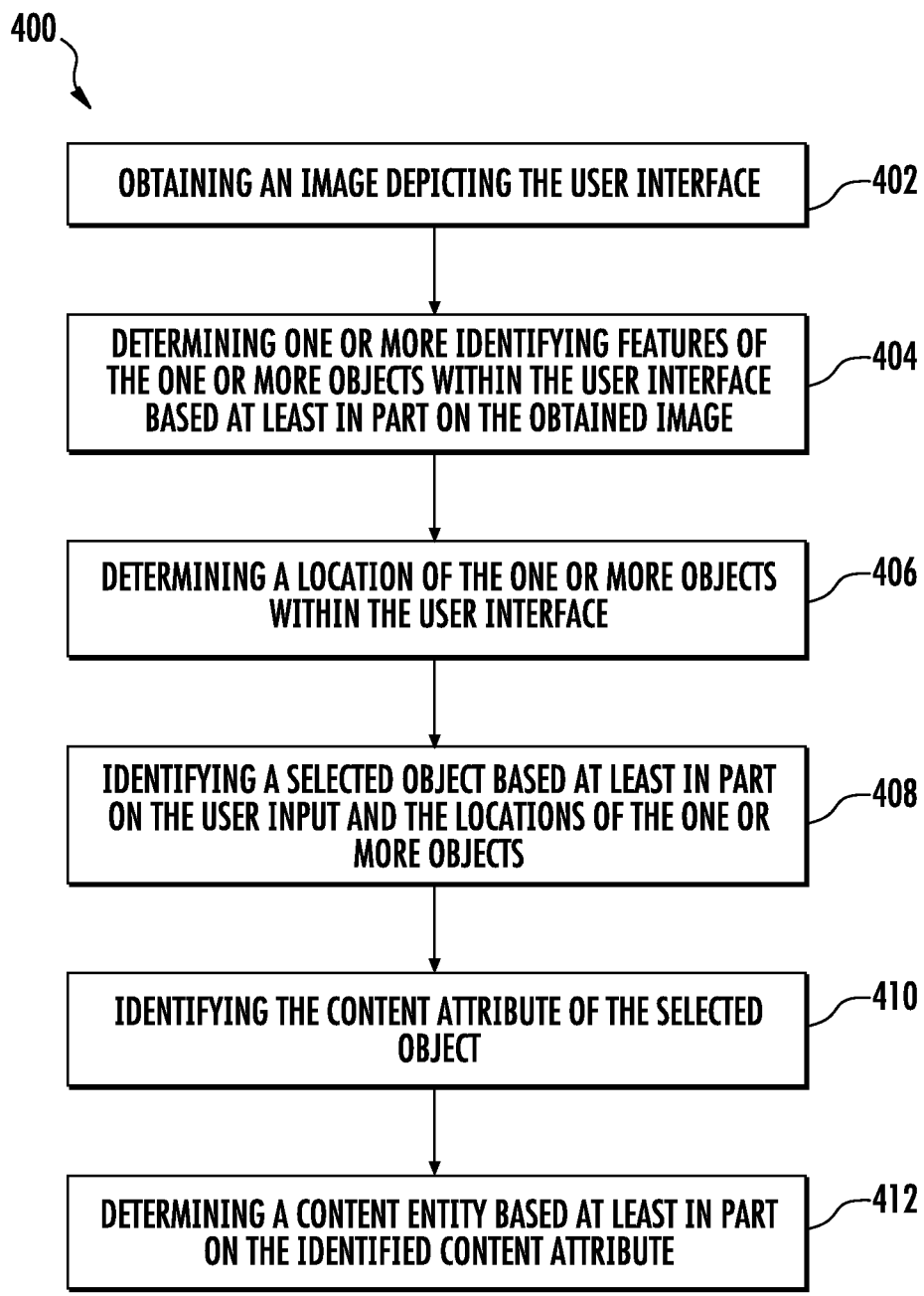
FIG. 6 depicts a flow diagram of an example method of determining a content entity according to example embodiments of the present disclosure.

FIG. 6 depicts a flow diagram of an example method (400) of determining a content entity according to example embodiments of the present disclosure. Method (400) can be implemented by one or more computing devices, such as one or more of the computing devices depicted in FIG. 8. In particular implementations, method (400) can be implemented by content identifier 102, entity selector 104 and/or action determiner 106 depicted in FIG. 1. In addition, FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include obtaining an electronic image depicting a user interface. For instance, the image can be obtained in response to receiving a user input indicative of a request to select or highlight one or more objects within the user interface. In some implementations, the image can be obtained by capturing a screenshot of the user interface by the user device.

At (404), method (400) can include determining one or more identifying features of the one or more objects within the user interface based at least in part on the obtained image. For instance, the identifying features can be associated with a content attribute of the one or more objects. The identifying features can include a type of the objects (e.g. text object, image object), and/or an identification of the content of the objects (e.g. recognition of text, items within an image, etc.)

At (406), method (400) includes determining a location of the one or more objects within the user interface. For instance, the location can include coordinates (e.g. x,y coordinates relative to the display device and/or the user interface.

At (408), method (400) can include identifying an object selected by the user (e.g. selected object) based at least in part on the user input and the locations of the one or more objects. For instance, the selected object can be determined by comparing a location associated with the user input to the locations of the objects within the user interface.

At (410), method (400) can include identifying the content attribute of the selected object. At (412), method (400) can include determining a content entity based at least in part on the identified content attribute. In some implementations, the content entity can be determined based at least in part on the content attributes of one or more additional objects and/or a layout/configuration (e.g. size, fonts, locations, etc.) of one or more objects within the user interface.

Figure 7:
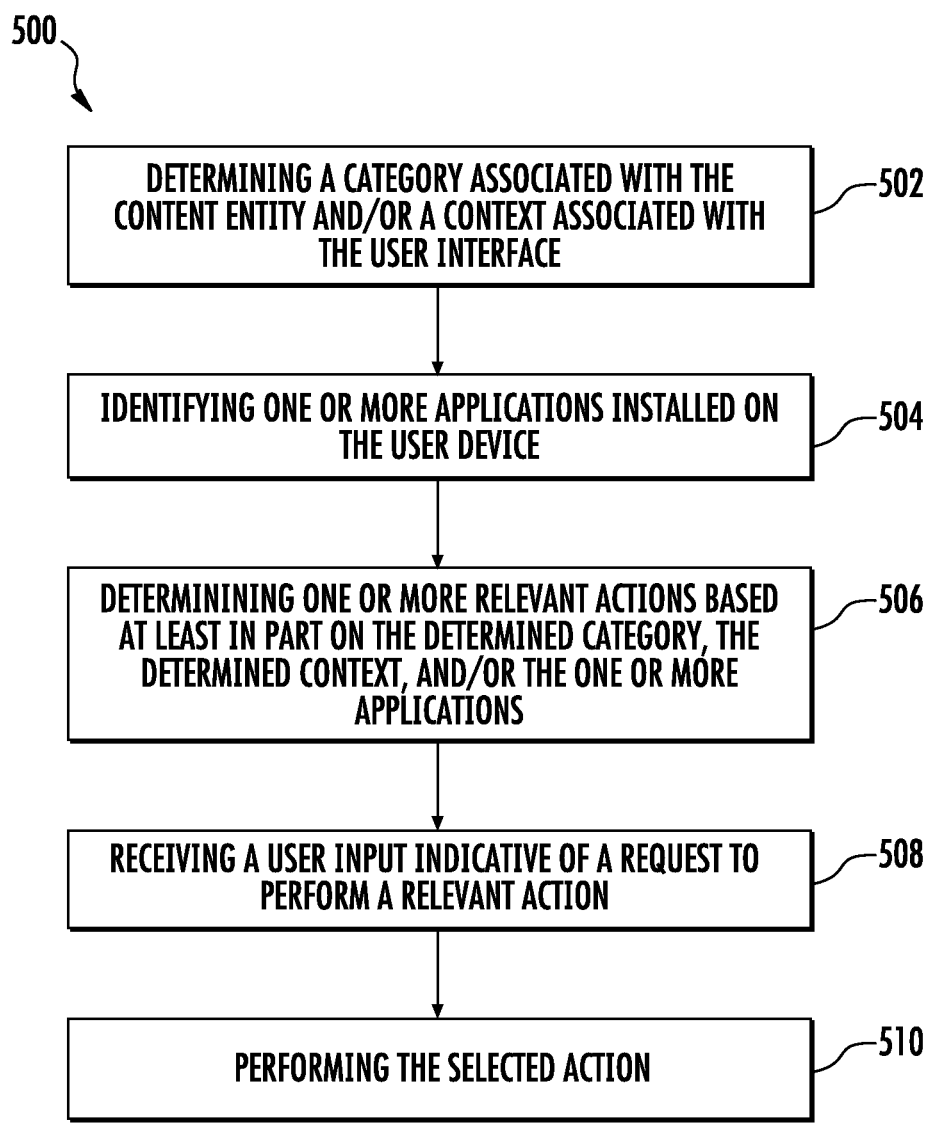
FIG. 7 depicts a flow diagram of an example method of determining relevant actions according to example embodiments of the present disclosure.

FIG. 7 depicts a flow diagram of an example method (500) of determining one or more relevant actions according to example embodiments of the present disclosure. Method (500) can be implemented by one or more computing devices, such as one or more of the computing devices depicted in FIG. 8. In particular implementations, method (400) can be implemented by content identifier 102, entity selector 104 and/or action determiner 106 depicted in FIG. 1. In addition, FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (502), method (500) can include determining a category associated with a content entity and/or a context associated with the user interface. The category can include or otherwise be associated with a classification of the content entity. The category and/or classification can specify one or more characteristics of the content entity. For instance, the one or more characteristics can indicate that the content entity is a phrase in a particular language, an address, a person's name, a book title, point of interest, a business, etc. In some implementations, the one or more characteristics can describe or identify a type of item depicted in an image. The context associated with the user interface can be associated with a current status of the user interface and/or the user device. For instance, the context can specify an application from which the content entity was selected. As another example, the context can specify one or more applications currently running on the user device. As yet another example, the context can indicate additional information associated with the user interface at the time of the user input. In this manner, the context can describe one or more aspects of the information displayed within the user interface in addition to the content entity.

At (504), method (500) can include identifying one or more applications installed on the user device. For instance, the user device may include a plurality of applications that are installed on or otherwise associated with the user device. Such applications may include a search application, a web browser, a movie application, a music application, a weather application, a messaging application, and/or various other suitable applications.

At (506), method (500) can include determining one or more relevant actions based at least in part on the determined category, the determined context, and/or the one or more applications installed on the user device. As indicated above, the relevant actions may include actions to be performed by the one or more applications in reference to the content entity and/or a context associated with the user device.

At (508), method (500) can include receiving a user input indicative of a request to perform a relevant action. For instance, data indicative of at least one relevant action may be displayed, for instance, as an icon, within the user interface. The user may interact with the icon to select a relevant action, and to prompt the user device to perform the selected action.

At (510), method (500) can include performing the selected action. For instance, performing the selected action may include opening the corresponding application on the user device, and performing the action using the application.

Figure 8:
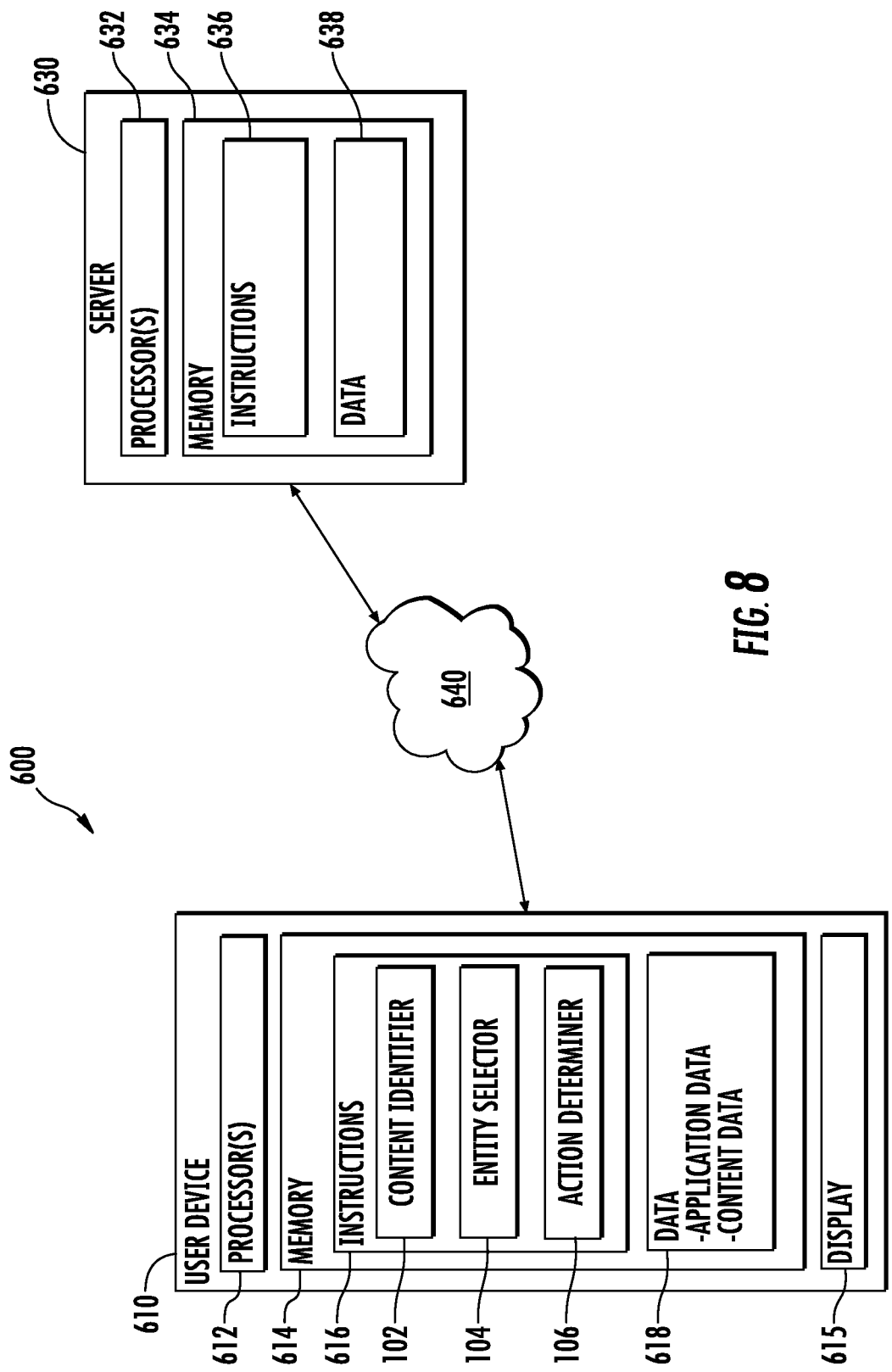
FIG. 8 depicts an example system according to example embodiments of the present disclosure.

FIG. 8 depicts an example computing system 600 that can be used to implement the methods and systems according to example aspects of the present disclosure. The system 600 can be implemented using a client-server architecture that includes a server 610 that communicates with one or more servers 630 over a network 640. The system 600 can be implemented using other suitable architectures, such as a single computing device (e.g. user device 610).

The system 600 includes a user device 610. The user device 610 can be any suitable user device, such as a general purpose computer, special purpose computer, laptop, desktop, mobile device, navigation system, smartphone, tablet, wearable computing device, a display with one or more processors, or other suitable computing device. The user device 610 can have one or more processors 612 and one or more memory devices 614. The user device 610 can also include a network interface used to communicate with one or more servers 630 over the network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, graphics processing units (GPUs) dedicated to efficiently rendering images or performing other specialized calculations, or other suitable processing device. The one or more memory devices 614 can include one or more computer-readable media, including, but not limited to, non-transitory computer-readable media, RAM, ROM, hard drives, flash drives, or other memory devices. The one or more memory devices 614 can store information accessible by the one or more processors 612, including computer-readable instructions 616 that can be executed by the one or more processors 612. The instructions 616 can be any set of instructions that when executed by the one or more processors 612, cause the one or more processors 612 to perform operations. For instance, the instructions 716 can be executed by the one or more processors 712 to implement content identifier 102, entity selector 104, and/or action determiner 106 described with reference to FIG. 1.

As shown in FIG. 8, the one or more memory devices 614 can also store data 618 that can be retrieved, manipulated, created, or stored by the one or more processors 612. The data 618 can include, for instance, application data, content data determined according to example aspects of the present disclosure, and other data.

The user device 610 of FIG. 8 can include various input/output devices for providing and receiving information from a user, such as a touch screen, touch pad, data entry keys, speakers, and/or a microphone suitable for voice recognition. For instance, the user device 610 can have a display device 615 for presenting a user interface displaying a plurality of objects and/or a content selection element according to example aspects of the present disclosure.

The user device 610 can exchange data with one or more servers 630 (e.g. web servers) over the network 640. The server 630 can be implemented using any suitable computing device(s). Although two servers 630 are illustrated in FIG. 8, any number of servers 630 can be connected to the user device 610 over the network 640.

Similar to the user device 610, a server 630 can include one or more processor(s) 632 and a memory 634. The one or more processor(s) 632 can include one or more central processing units (CPUs), and/or other processing devices. The memory 634 can include one or more computer-readable media and can store information accessible by the one or more processors 632, including instructions 636 that can be executed by the one or more processors 632. The memory 634 can also store data 638. The data 638 can be stored in one or more databases. The one or more databases can be connected to the server 630 by a high bandwidth LAN or WAN, or can also be connected to server 630 through network 640. The one or more databases can be split up so that they are located in multiple locales.

The server 630 can also include a network interface used to communicate with one or more remote computing devices (e.g. user device 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. The network 640 can also include a direct connection between a server 630 and the user device 610. In general, communication between the user device 610 and a server 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
receiving, by one or more computing devices, one or more signals indicative of user input selecting a particular object of a plurality of different objects displayed within a user interface; and
responsive to receiving the one or more signals:
utilizing, by the one or more computing devices, one or more machine-learning techniques to determine a content entity associated with the particular object and estimating one or more objects of the plurality of different objects intended to be selected via the user input, the content entity comprising the particular object and one or more additional objects of the plurality of different objects proximate the particular object and determined to form a cohesive entity with the particular object;
determining, by the one or more computing devices, one or more relevant actions to be performed based at least in part on the content entity;
providing, by the one or more computing devices and within the user interface, data indicative of the one or more relevant actions; and
responsive to selection of a particular relevant action of the one or more relevant actions, prompting, by the one or more computing devices, the one or more computing devices to perform the particular relevant action.

2. The computer-implemented method of claim 1, wherein utilizing the one or more machine-learning techniques to determine the content entity comprises utilizing one or more neural networks to determine the content entity.

3. The computer-implemented method of claim 2, wherein utilizing the one or more neural networks to determine the content entity comprises:
providing, to the one or more neural networks, data indicative of the particular object and the one or more additional objects; and providing, by the one or more neural networks, data indicative that the particular object and the one or more additional objects form the content entity.

4. The computer-implemented method of claim 1, wherein:
the particular object comprises an image; and
utilizing the one or more machine-learning techniques to determine the content entity comprises utilizing the one or more machine-learning techniques to determine the content entity comprises one or more items depicted in the image.

5. The computer-implemented method of claim 1, wherein:
the particular object comprises a portion of a textual entity; and
utilizing the one or more machine-learning techniques to determine the content entity comprises utilizing the one or more machine-learning techniques to determine the content entity comprises one or more additional portions of the textual entity.

6. The computer-implemented method of claim 1, wherein utilizing the one or more machine-learning techniques to determine the content entity comprises utilizing the one or more machine-learning techniques to determine the content entity based at least in part on one or more sizes or locations of the one or more additional objects.

7. The computer-implemented method of claim 1, wherein utilizing the one or more machine-learning techniques to determine the content entity comprises utilizing the one or more machine-learning techniques to determine one or more of a category or classification associated with the content entity.

8. The computer-implemented method of claim 7, wherein determining the one or more relevant actions comprises determining the one or more relevant actions based at least in part on the one or more of the category or the classification associated with the content entity.

9. The computer-implemented method of claim 1, wherein determining the one or more relevant actions comprises determining the one or more relevant actions based at least in part on a context of the user interface.

10. The computer-implemented method of claim 9, wherein the context is associated with one or more applications currently running on the one or more computing devices.

11. The computer-implemented method of claim 1, comprising:
determining, by the one or more computing devices, a content attribute of the particular object; and
analyzing, by the one or more computing devices, the content attribute of the particular object in view of one or more content attributes of the one or more additional objects to determine that the particular object and the one or more additional objects form the cohesive entity.

12. The computer-implemented method of claim 1, wherein determining the one or more relevant actions comprises utilizing one or more machine-learning techniques to determine the one or more relevant actions.

13. The computer-implemented method of claim 12, wherein utilizing the one or more machine-learning techniques to determine the one or more relevant actions comprises utilizing one or more neural networks to determine the one or more relevant actions.

14. The computer-implemented method of claim 13, wherein utilizing the one or more neural networks to determine the one or more relevant actions comprises:

providing, the one or more neural networks, with data indicative of the content entity and a context of the user interface; and
providing, by the one or more neural networks, data indicative of the one or more relevant actions.

15. A system comprising:
one or more processors; and
a memory storing instructions that when executed by the one or more processors cause the system to perform operations comprising:
receiving one or more signals indicative of user input selecting a particular object of a plurality of different objects displayed within a user interface; and
responsive to receiving the one or more signals:
utilizing one or more machine-learning techniques to determine a content entity associated with the particular object and estimating one or more objects of the plurality of different objects intended to be selected via the user input, the content entity comprising the particular object and one or more additional objects of the plurality of different objects proximate the particular object and determined to form a cohesive entity with the particular object;
determining one or more relevant actions to be performed based at least in part on the content entity;
providing, within the user interface, data indicative of the one or more relevant actions; and
responsive to selection of a particular relevant action of the one or more relevant actions, prompting the system to perform the particular relevant action.

16. The system of claim 15, wherein utilizing the one or more machine-learning techniques to determine the content entity comprises utilizing one or more neural networks to determine the content entity.

17. The system of claim 16, wherein utilizing the one or more neural networks to determine the content entity comprises:
providing, to the one or more neural networks, data indicative of the particular object and the one or more additional objects; and
providing, by the one or more neural networks, data indicative that the particular object and the one or more additional objects form the content entity.

18. One or more non-transitory computer-readable media comprising instructions that when executed by one or more computing devices cause the one or more computing devices to perform operations comprising:
receiving one or more signals indicative of user input selecting a particular object of a plurality of different objects displayed within a user interface; and
responsive to receiving the one or more signals:
utilizing one or more machine-learning techniques to determine a content entity associated with the particular object and estimating one or more objects of the plurality of different objects intended to be selected via the user input, the content entity comprising the particular object and one or more additional objects of the plurality of different objects proximate the particular object and determined to form a cohesive entity with the particular object;
determining one or more relevant actions to be performed based at least in part on the content entity;
providing, within the user interface, data indicative of the one or more relevant actions; and responsive to selection of a particular relevant action of the one or more relevant actions, prompting the one or more computing devices to perform the particular relevant action.

19. The one or more non-transitory computer-readable media of claim 18, wherein utilizing the one or more machine-learning techniques to determine the content entity comprises utilizing one or more neural networks to determine the content entity.

20. The one or more non-transitory computer-readable media of claim 19, wherein utilizing the one or more neural networks to determine the content entity comprises:
- providing, to the one or more neural networks, data indicative of the particular object and the one or more additional objects; and
- providing, by the one or more neural networks, data indicative that the particular object and the one or more additional objects form the content entity.

* * * * *